United States Patent [19]

O'Callaghan

[11] Patent Number: 5,339,213

[45] Date of Patent: Aug. 16, 1994

[54] PORTABLE COMPUTER TOUCH PAD ATTACHMENT

[75] Inventor: James L. O'Callaghan, Salt Lake City, Utah

[73] Assignee: Cirque Corporation, Salt Lake City, Utah

[21] Appl. No.: 977,134

[22] Filed: Nov. 16, 1992

[51] Int. Cl.$^5$ .......................... H05K 7/14; G06F 1/16
[52] U.S. Cl. ..................................... 361/683; 361/727; 312/223.6; 312/330.1; 248/918; 248/442.2
[58] Field of Search ............... 312/223.2, 223.3, 223.6, 312/233, 330.1, 334.21; 248/918, 118.1, 442.2, 461, 456, 677, 205.3; 361/380, 390-395, 399, 679-687, 725, 727; 174/DIG. 9; 364/708, 708.1; 340/711; 345/167, 905

[56] References Cited

U.S. PATENT DOCUMENTS

| | | | |
|---|---|---|---|
| 4,681,378 | 7/1987 | Hellman, III | 312/223.2 |
| 4,946,121 | 8/1990 | Troke | 248/205.3 |
| 5,141,196 | 8/1992 | Arnold et al. | 248/456 X |
| 5,169,116 | 12/1992 | Bergetz | 248/205.3 X |

Primary Examiner—Leo P. Picard
Assistant Examiner—Michael W. Phillips
Attorney, Agent, or Firm—Thorpe, North & Western

[57] ABSTRACT

A device and a method for attaching a touch pad to a portable computer comprises a tray for holding the touch pad securely, a rail guide attachable to the underside of the computer, and a pair of rails, to which the tray is attached, slidably disposed in slots in the rail guide. The tray, and thus the touch pad, may slide to a location under the computer where it is not exposed or may slide from under the computer so that the touch pad is exposed. The tray may be pivoted so that the touch pad more directly faces the user. Support arms may be engaged between the tray and the rails to maintain the touch pad in the tilted position. Feet may be used to support the computer above a surface to furnish space for the attachment device. Cable guides may be provided as part of the rail guide and feet to guide the touch pad cable to the proper computer port and to relieve strain on the cable.

16 Claims, 2 Drawing Sheets

PORTABLE COMPUTER TOUCH PAD ATTACHMENT

BACKGROUND OF THE INVENTION

This invention relates to a device and a method for attaching a touch pad to a portable computer. More particularly, this invention relates to attachment of an after-market touch pad to a portable computer so that it may be stored and protected under the computer when not in use and may be moved out from under the computer when needed.

Pointing devices for cursor control have become very popular in personal computing. These pointing devices are embodied in a number of different forms including touch pads, mice, joysticks, trackballs, and digitizer tablets. Although such pointing devices may be built-in as original equipment, they are oftentimes added later as a special attachment. It is desirable to be able to attach such after-market pointing devices to the outside of the portable computer to which they are connected for convenience of the users and storage and protection of the devices.

Examples of methods that have been used to attach pointing devices to portable computers include using synthetic materials which adhere when pressed together, i.e. "VELCRO" strips, to attach joysticks to the side of the computer, and clipping micro trackballs to the side of the computer with spring clips. Such attachment methods, however, are unwieldy and unsightly. Further, such attachments are oftentimes not secure, and thus there is a danger of damaging the pointing device should it fall or be knocked off. Also, with such attachment methods, the pointing device must typically be removed before the portable computer can be placed in its case for storage or transport.

A problem associated with some pointing devices, such as a trackball or a mouse, is that a surface is needed on which to roll the ball for controlling the cursor or else the operator must roll the ball with a finger. This can be inconvenient or unwieldy. Touch pads overcome this and other drawbacks of other pointing devices because they can be built in very compact and lightweight form, are stationary, and no desk surface is needed to operate them. Other drawbacks of attaching pointing devices to portable computers might be ameliorated if touch pads could be securely mounted in an out-of-the-way, yet accessible manner to such computers.

OBJECTS AND SUMMARY OF THE INVENTION

It is an object of the present invention to provide a method and apparatus for attaching a touch pad to a portable computer so that it is out of the way for storage when not in use, yet is readily accessible.

It is also an object of the invention to provide a method and apparatus for attaching a touch pad to a portable computer so that the touch pad need not be removed before placing the computer in its carrying case.

It is another object of the invention to provide a method and apparatus for attaching a touch pad to a portable computer so that the touch pad is protected when it is not in use.

It is a further object of the invention to provide a method and apparatus for attaching a touch pad to a portable computer in a secure and professional-appearing manner.

It is still another object of the invention to provide a method and apparatus for attaching a touch pad to a portable computer so that the touch pad may be selectively moved between a protected location under the computer and an accessible location.

These and other objects are realized in an illustrative attachment device which includes a tray for holding the touch pad, and a mechanism for attaching the tray to the underside of the computer to allow moving the tray, and thus the touch pad, between a position under the computer where the touch pad is protected, and a position from under the computer where the touch pad is accessible. In accordance with one aspect of the invention, the attachment device includes a pivoting mechanism for enabling the pivoting of the tray, and thus touch pad, to a tilted position where the touch pad more directly faces the user.

DETAILED DESCRIPTION OF THE INVENTION

Figure 1:
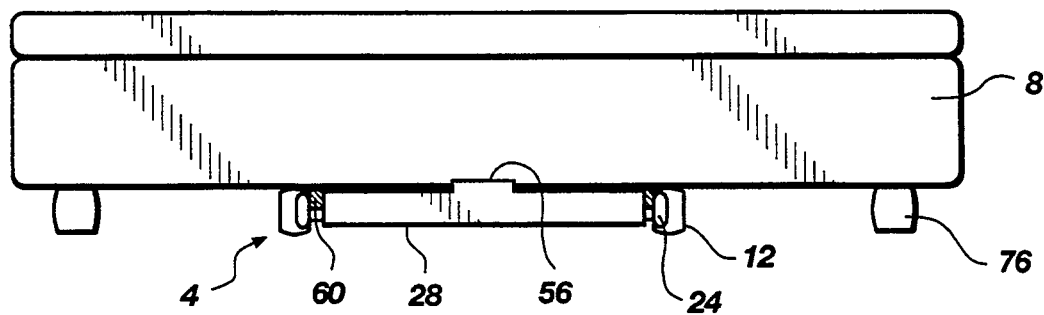
FIG. 1 is an elevational front view of the attachment device mounted under a portable computer, in accordance with the present invention.
Figure 2:
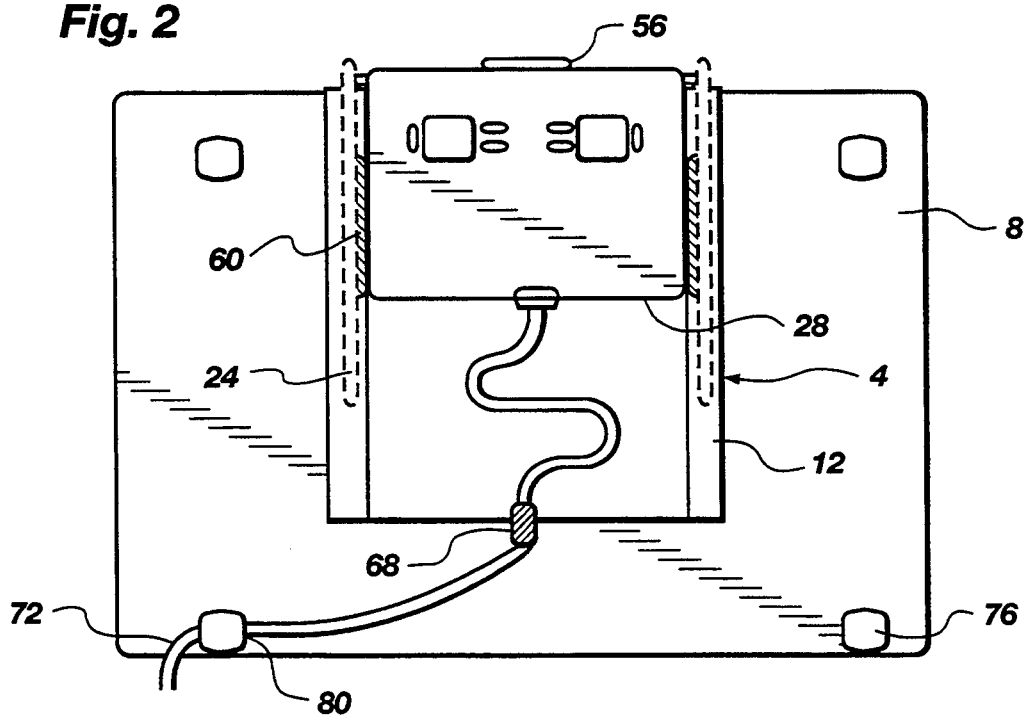
FIG. 2 is a bottom view of the attachment device mounted under a portable computer, in accordance with the present invention.

FIGS. 1 and 2 show an illustrative attachment device 4, made in accordance with the present invention, installed on the underside of a portable computer 8. In concept, the attachment device 4 comprises a tray for holding a touch pad, a mechanism for moving the tray and, thus, the touch pad between a storage site and an accessible site, and for attaching the tray to the underside of a portable computer.

Figure 3:
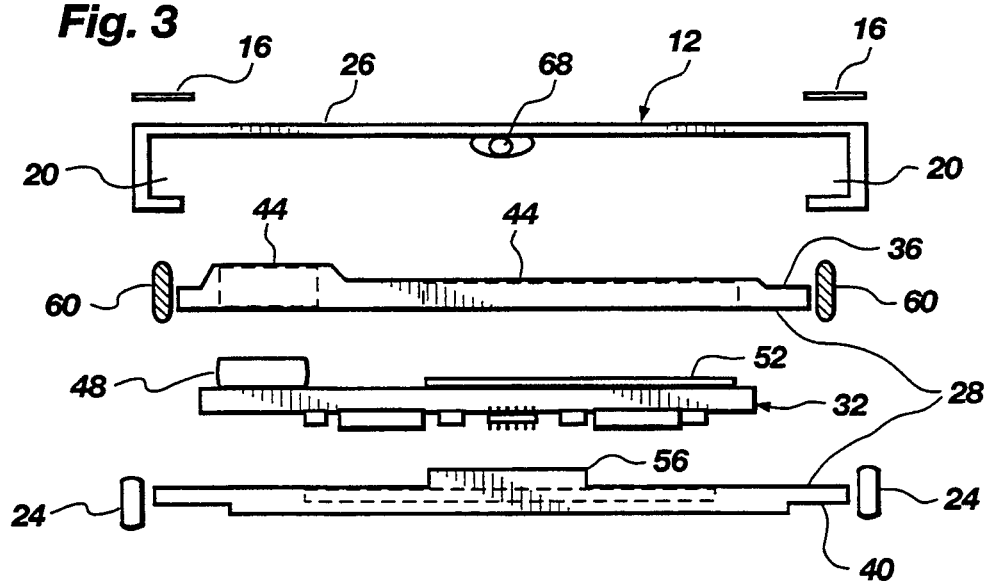
FIG. 3 is an exploded front view of the attachment device, in accordance with the present invention.
Figure 5:
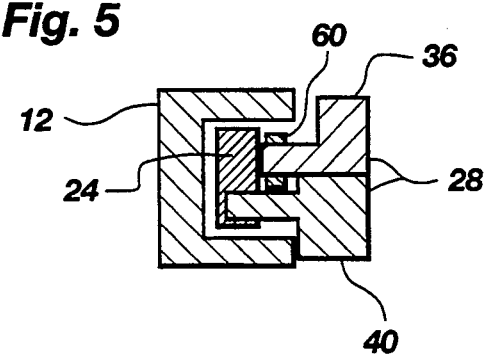
FIG. 5 is a front, cross-sectional view of one rail assembly of the device of FIG. 4.

A preferred embodiment of the attachment device is shown in FIG. 3 to include a rail guide 12 attachable to the underside of a portable computer 8 by any of a variety of attaching mechanisms, such as double-sided adhesive tape 16. The rail guide 12 defines a pair of parallel, facing slots 20 for receiving slidable rails 24, as depicted in FIG. 5. The slots 20 are U-shaped in cross-section and are held together by a planar member 26. The rails 24 are attached to a tray 28 for holding a touch pad 32.

Figure 4:
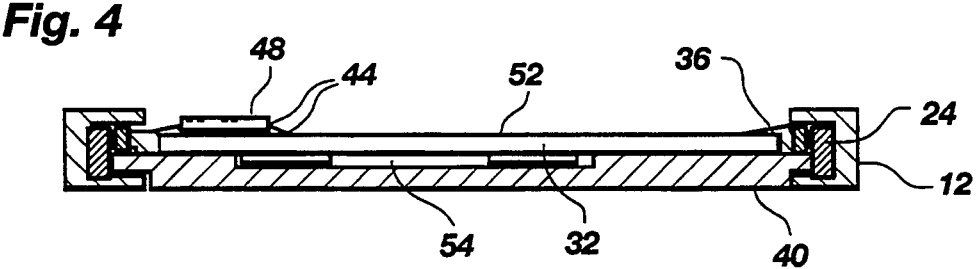
FIG. 4 is a front, cross-sectional view of the attachment device, in accordance with the present invention.
Figure 6:
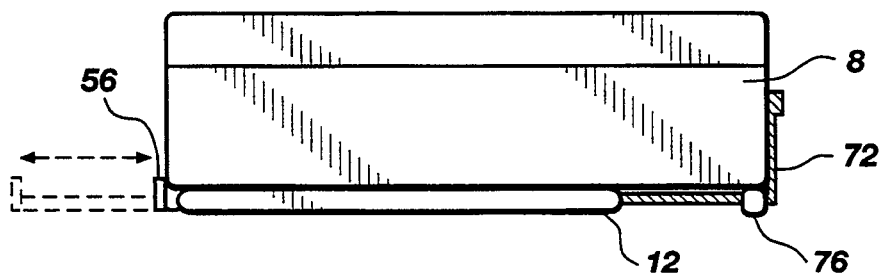
FIG. 6 is an elevational side view of the attachment device mounted under a portable computer with, in phantom, the tray extended to make the touch pad accessible for use, in accordance with the present invention.

In the preferred embodiment shown in FIG. 3, the tray 28 includes a top plate 36 and a bottom plate 40 that fit together, one on top of the other, to securely hold the touch pad 32. The top plate 36 is generally a planar sheet, but includes raised areas 42 for accommodating the contours of the touch pad 32 and openings 44 or cutouts (best seen in FIG. 4) for exposing buttons 48 and a pad 52 that are manipulated by the operator to move the cursor of the computer 8. The bottom plate 40 is also generally planar, but contains a recess 54 for holding electronic components of the touch pad 32 that extend from the touch pad 32. The openings 44 in the top plate 36 and recess 54 in the bottom plate 40 help reduce the thickness of the tray 28. The bottom plate 40 also includes a tab 56 that is graspable by the operator for sliding the tray 28 and rails 24 under the computer 8 for storage or from under the computer 8 for accessibility, as shown in phantom in FIG. 6.

Figure 7:
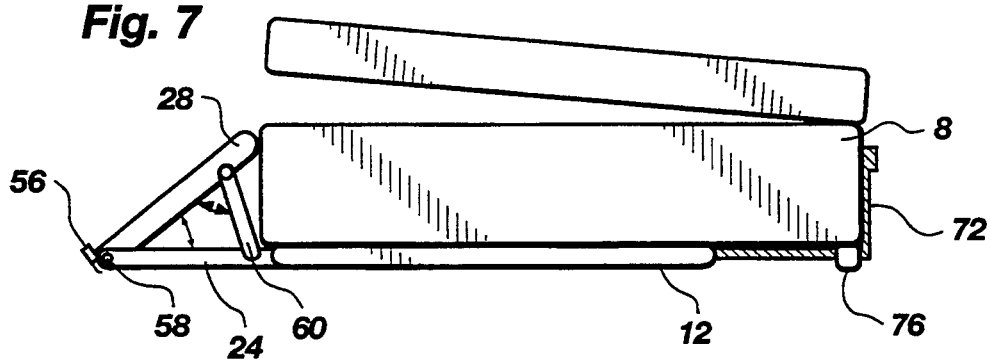
FIG. 7 is an elevational side view of the attachment device under a portable computer with the tray supported in a tilted orientation by the support arms, in accordance with the present invention.
Figure 8:
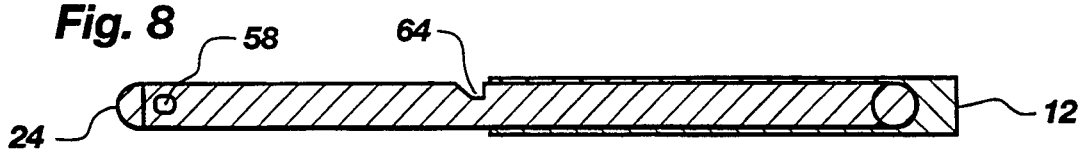
FIG. 8 is an elevational side view of a rail in an extended position, in accordance with the present invention.

Another feature of a preferred embodiment of the invention is the capacity to tilt the tray 28 at an angle for greater convenience to the operator. Although an operator would be able to use the touch pad 32 in a horizontal orientation, it may be easier to use with the touch pad 32 tilted to more directly face the user. As shown in FIG. 7, these advantages can be obtained by attaching the tray 28 to the rails 24 at pivot points 58 in the rails 24. With the pivot points 58 at the forward ends of the rails 24 and tray 28, the rear end of the tray 28 can be raised. Support arms 60, comprising elongate bars pivotally attached near one end to the tray 28, may be lowered to support the tray 28 in a tilted orientation. Detents 64, shown in FIG. 8, in the rails 24 may receive the free ends of the support arms 60 to hold them in place and maintain the angle at which the tray 28 is tilted.

The rail guide 12 also may advantageously contain a cable guide 68, shown in FIGS. 2 and 3, for guiding and relieving strain on the cable 72 that connects the touch pad 32 to a port on the computer 8. The cable guide 68 illustrated in FIGS. 2 and 3 is an opening in a tab extending from the planar member 26 of the rail guide 12.

A preferred embodiment of the present invention is only 4.0 inches wide and 0.35 inches thick. Nevertheless, there may not be sufficient space beneath a particular portable computer 8 for the attachment device 4 to fit. Feet 76 of sufficient height to provide clearance for the attachment device may be attached to the underside of the computer to resolve this problem, as shown in FIG. 1. A foot 76 may also contain an opening 80 through which the cable 72 may pass so that the foot guides and relieves strain on the cable 72, as shown in FIG. 2.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements.

I claim:

1. A device for attaching a computer input touch pad to a portable computer having a generally flat underside, comprising
    a tray for receiving and holding the touch pad, the tray comprising a top plate and a bottom plate that fit together, one on top of the other, to enclose and securely hold the touch pad, said top plate having openings to expose buttons, pads, and the like for operating the touch pad, and said bottom plate having a recess for receiving components that extend from the touch pad and a tab that is graspable for moving the tray and touch pad between the location under the computer and the exposed location; and
    means for attaching the tray to the underside of the portable computer, and for allowing movement of the tray, and thus the touch pad, between a location under the computer where the touch pad operating surface is not exposed, and a location from under the computer where the touch pad operating surface is exposed.

2. The device as in claim 1 wherein the means for attaching the tray to the underside of the portable computer and for allowing movement of the tray comprise
    a rail guide for slidably receiving at least a pair of rails; and
    at least a pair of slidable rails disposed on the tray, said rails being slidably disposed in the rail guide so that the tray, and thus the touch pad, may slide to the location under the computer and may slide partially out of the rail guide to the exposed location from under the computer.

3. The device as in claim 2 further comprising means for pivoting the tray, and thus the touch pad, to a tilted position where the touch pad more directly faces the user, and for supporting the tray to maintain such tilted position.

4. The device as in claim 3 wherein the pivoting and supporting means comprise
    one or more pivots for attaching the tray to the rails so that the tray may be pivoted into the tilted position, and
    one or more support arms having attached and free ends so that the attached ends are pivotally disposed on the tray and the free ends may be positioned to support the tray in the tilted position.

5. The device as in claim 4 wherein the rails include detents for receiving the free ends of the support arms for supporting the tray in the tilted position.

6. The device as in claim 2 wherein the rail guide further comprises a cable guide for guiding a cable that connects the touch pad to the computer and for relieving strain on said cable.

7. The device as in claim 1 wherein the attaching means comprises double-sided adhesive tape.

8. A method for attaching a computer input touch pad to a portable computer having a generally flat underside comprising
    (a) providing a tray for receiving and holding the touch pad the tray including a top plate and a bottom plate that fit together, one on top of the other, to enclose and securely hold the touch pad, the top plate being provided with openings to expose buttons, pads, and the like for operating the touch pad, and said bottom plate being provided with a recess for receiving components pad that extend from the touch pad and a tab that is graspable for moving the tray and touch pad between a location under the computer and an exposed location; and
    (b) providing means for attaching the tray to the underside of the portable computer, and for allowing movement of the tray, and thus the touch pad, between the location under the computer where the touch pad operating surface is not exposed, and the location from under the computer where the touch pad operating surface is exposed.

9. The method as in claim 8 wherein the step of providing means for attaching the tray to the underside of the portable computer and for allowing movement of the tray comprises attaching a rail guide to the computer for slidably receiving at least a pair of rails; and disposing at least a pair of slidable rails on the tray, to slidably move in the rail guide so that the tray, and thus the touch pad, may slide to the location under the computer and may slide partially out of the rail guide to the exposed location from under the computer.

10. The method as in claim 9 further comprising providing means for pivoting the tray, and thus the touch pad, to a tilted position where the touch pad more directly faces the user, and for supporting the tray to maintain such tilted position.

11. The method as in claim 10 wherein the step of providing the pivoting and supporting means comprises disposing one or more pivots to the rails, and attaching said pivots to the tray so that the tray may be pivoted into the tilted position, and attaching one or more support arms having attached and free ends so that the attached ends are pivotally disposed on the tray and the free ends may be positioned to support the tray in the tilted position.

12. The method as in claim 11 further comprising providing the rails with detents for receiving the free ends of the support arms for supporting the tray in the tilted position.

13. The method as in claim 9 further comprising providing the rail guide with a cable guide for guiding a cable that connects the touch pad to the computer and for relieving strain on said cable.

14. The method as in claim 8 wherein the step of providing the attaching means comprises providing double-sided adhesive tape.

15. The method as in claim 8 further comprising providing feet that are attachable to the computer for supporting the computer above a surface so that there is sufficient space between said surface and the underside of the computer for the tray and the attachment and movement means.

16. The method as in claim 15 wherein a foot contains an opening through which the cable connecting the touch pad to the computer may pass for guiding and relieving strain on said cable.

* * * * *